US011905011B2

(12) United States Patent
Jung et al.

(10) Patent No.: US 11,905,011 B2
(45) Date of Patent: Feb. 20, 2024

(54) AIR MOBILITY

(71) Applicants: Hyundai Motor Company, Seoul (KR); Kia Corporation, Seoul (KR)

(72) Inventors: Sang Hyun Jung, Hwaseong-si (KR); Kyu Hoon Cho, Suwon-si (KR); Chung Sik Yim, Anyang-si (KR); Jae Young Choi, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/378,693

(22) Filed: Jul. 17, 2021

(65) Prior Publication Data

US 2022/0194550 A1 Jun. 23, 2022

(30) Foreign Application Priority Data

Dec. 17, 2020 (KR) .................. 10-2020-0177695

(51) Int. Cl.
*B64C 3/54* (2006.01)
*B64C 29/00* (2006.01)
*B64C 3/56* (2006.01)
*B64C 9/22* (2006.01)
*B64C 13/32* (2006.01)

(52) U.S. Cl.
CPC .............. *B64C 3/546* (2013.01); *B64C 3/56* (2013.01); *B64C 9/22* (2013.01); *B64C 13/32* (2013.01); *B64C 29/0008* (2013.01)

(58) Field of Classification Search
CPC .. B64C 3/546; B64C 3/56; B64C 9/22; B64C 29/0008
See application file for complete search history.

(56) References Cited

U.S. PATENT DOCUMENTS

| 1,711,637 | A  | * | 5/1929 | Sherman | B64C 3/56 244/49 |
| 7,066,428 | B1 | * | 6/2006 | Haggard | B64C 3/56 244/49 |
| 2010/0140414 | A1 | * | 6/2010 | Beyer | B64C 9/24 244/134 B |
| 2019/0023389 | A1 | * | 1/2019 | Murrow | B64D 29/04 |
| 2022/0081111 | A1 | * | 3/2022 | Pei | B64C 3/56 |

FOREIGN PATENT DOCUMENTS

| KR | 10-2020-0104582 A | 9/2020 |
| WO | WO-2018/209911 | 11/2018 |

\* cited by examiner

*Primary Examiner* — Nicholas McFall
(74) *Attorney, Agent, or Firm* — MORGAN, LEWIS & BOCKIUS LLP

(57) ABSTRACT

An air mobility may include a wing portion extending from a fuselage of the air mobility; a folded portion provided at an edge portion of the wing portion, configured to extend from the wing portion to form a part of the wing portion during unfolding of the folded portion, and configured to move to overlap with the wing portion during folding of the folded portion, so that an area of air resistance in a vertical direction of the wing portion is reduced; an actuator connected to the folded portion and configured to provide power to the folded portion, so that the folded portion is unfolded or folded to the wing portion; and a controller connected to the actuator and configured to control the actuator, so that the folded portion is folded during vertical takeoff or landing of the fuselage, and configured to control the actuator to unfold the folded portion during cruising of the fuselage.

10 Claims, 5 Drawing Sheets

AIR MOBILITY

CROSS REFERENCE TO RELATED APPLICATION

The present application claims priority to Korean Patent Application No. 10-2020-0177695, filed Dec. 17, 2020, the entire contents of which is incorporated herein for all purposes by this reference.

BACKGROUND OF THE INVENTION

Field of the Invention

The present invention relates to an air mobility, and more particularly, to a technique for folding a wing of an air mobility.

Description of Related Art

Recently, an air mobility such as a drone has been actively developed and used in various fields, and manned drones configured for carrying people have also been developed and are reaching the stage of practical use.

The conventional air mobility may perform vertical takeoff and landing through a rotation wing, and fuel efficiency or electrical energy efficiency of the air mobility may be improved by cruising through a fixed wing after the vertical takeoff.

However, the conventional air mobility has a problem in that the required power is increased due to air resistance generated by the fixed wing during vertical takeoff or landing through the rotation wing.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air mobility, wherein a folded portion, which is portion of a wing portion, is folded to overlap with the wing portion through an actuator during vertical takeoff or landing of the air mobility to reduce air resistance, and the folded portion is deployed during cruising of the air mobility to improve fuel efficiency or electrical energy efficiency of the air mobility.

In various aspects of the present invention, there is provided an air mobility. The air mobility includes: a wing portion extending from a fuselage of the air mobility; a folded portion provided at an edge portion of the wing portion, configured to extend from the wing portion to form a part of the wing portion during unfolding of the folded portion, and configured to move to overlap with the wing portion during folding of the folded portion, so that an area of air resistance in a vertical direction of the wing portion may be reduced; an actuator connected to the folded portion and configured to provide power to the folded portion, so that the folded portion may be unfolded or folded to the wing portion; and a controller connected to the actuator and configured to control the actuator, so that the folded portion may be folded during vertical takeoff or landing of the fuselage, and configured to control the actuator to unfold the folded portion during cruising of the fuselage.

The wing portion and the folded portion may be located to be brought into surface-contact with each other, and the air mobility may include: a hinge portion coupled to lower portions of the wing portion and the folded portion to enable the folded portion to be rotatable with respect to the wing portion, wherein the actuator may be configured to rotate the folded portion around the hinge portion, so that the folded portion may be unfolded or folded.

The actuator may include: a driving device located in the wing portion and driven by the controller to rotate a driveshaft of the driving device; and a connection link configured such that a first end portion thereof may be connected to the driveshaft of the driving device and a second end portion thereof may be connected to the folded portion to unfold or fold the folded portion in a response to driving of the driving device.

The connection link may include: a first link connected at a first end portion thereof to the driveshaft of the driving device and configured to be rotated by a rotation of the driveshaft; and a second link rotatably connected at a first end portion thereof to a second end portion of the first link and rotatably connected at a second end portion thereof to a lower portion of the folded portion, wherein the folded portion may be configured to be unfolded or folded as the first link is rotated and displacement of the second link is changed.

The wing portion may include a first limiting portion configured to limit a rotational angle of the first link during unfolding or folding of the folded portion.

The wing portion may include a second limiting portion configured to limit displacement moving of the second link during folding of the folded portion.

The air mobility may include: a first magnetic module including a magnetic body located in the wing portion and a fixed portion located in the folded portion at a location corresponding to the magnetic body, wherein the first magnetic module may be configured to fix the wing portion and the folded portion during unfolding of the folded portion and to separate the wing portion and the folded portion from each other during folding of the folded portion as power is applied to the first magnetic module and a direction of a magnetic path is changed.

The controller may be connected to the first magnetic module, and be configured to control the first magnetic module to apply power to the magnetic body of the first magnetic module, so that the folded portion may be fixed to the wing portion during unfolding of the folded portion.

The air mobility may include: a second magnetic module including a magnetic body located in the wing portion and a fixed portion located in the folded portion at a location corresponding to the magnetic body, wherein the second magnetic module may be configured to separate the wing portion and the folded portion from each other during unfolding of the folded portion and to fix the wing portion and the folded portion during folding of the folded portion as power is applied to the second magnetic module and a direction of a magnetic path is changed.

The controller may be connected to the second magnetic module, and be configured to control the second magnetic module so that the folded portion may be fixed to the wing portion during folding of the folded portion.

The controller may be configured to control the actuator to fold the folded portion during vertical takeoff of the air mobility and to unfold the folded portion during cruising of the air mobility after the vertical takeoff.

The controller may be configured to control the actuator, so that the air mobility may be vertically landed in a state in which the folded portion may be unfolded and the folded portion may be folded after the vertical landing.

According to the air mobility of present invention, the air mobility is configured such that the actuator connected to the wing portion and the folded portion is operated to fold the folded portion during vertical takeoff or landing of the air mobility. Accordingly, air resistance generated during vertical takeoff or landing of the air mobility may be reduced and fuel efficiency or electrical energy efficiency of the air mobility may be improved.

The air mobility is configured such that the folded portion is unfolded during cruising of the air mobility to expand the wing portion. Accordingly, fuel efficiency or electrical energy efficiency used for cruising of the air mobility may be improved.

In the air mobility, the folded portion is firmly fixed by the magnetic module during unfolding or folding. Accordingly, probability of damage occurring due to a collision between the folded portion and the wing portion during rotation of the folded portion may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWING PARTS

Figure 1:
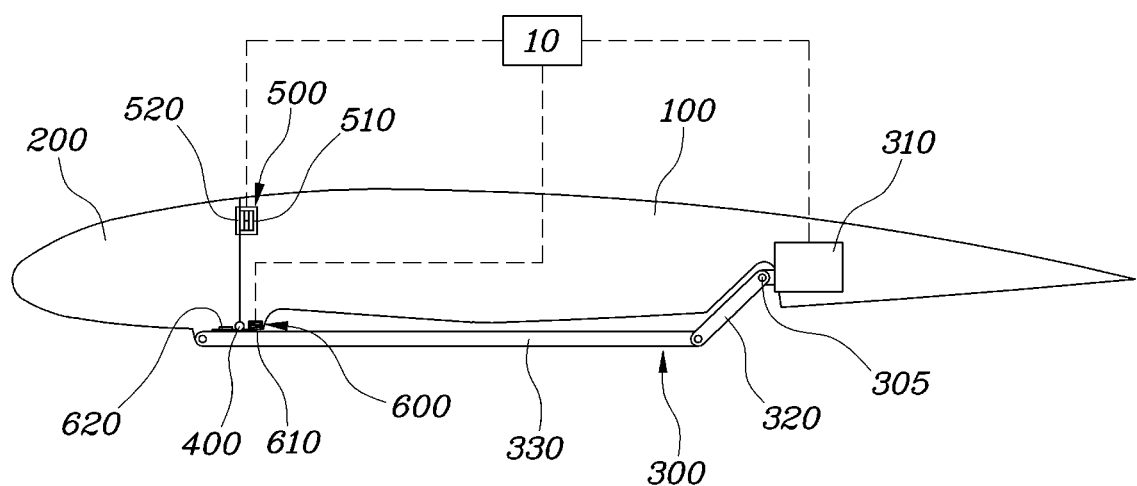
FIG. 1 is a side view showing an air mobility according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, the structural or functional description specified to an exemplary embodiment according to the concept of the present invention is intended to describe the exemplary embodiment of the present invention, so it may be understood that the present invention may be variously embodied, without being limited to the exemplary embodiment of the present invention.

An exemplary embodiment described herein may be changed in various ways and various shapes, so a specific embodiment is shown in the drawings and will be described in detail in the present specification. However, it may be understood that the exemplary embodiment according to the concept of the present invention is not limited to the exemplary embodiment which will be described hereinbelow with reference to the accompanying drawings, but all of modifications, equivalents, and substitutions are included in the scope and spirit of the present invention.

It will be understood that, although the terms first and/or second, etc. may be used herein to describe various elements, but these elements may not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" should be interpreted in the same manner as those described above.

The terminology used herein is for the purpose of describing particular embodiment only and is not intended to limit the present invention. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which various exemplary embodiments of the present invention belongs. It must be understood that the terms defined by the dictionary are identical with the meanings within the context of the related art, and they should not be ideally or excessively formally defined unless the context clearly dictates otherwise.

An exemplary embodiment will be described hereafter in detail with reference to the accompanying drawings. Like reference numerals provided in the drawings indicate like components.

A controller 10 according to the exemplary embodiment of the present invention may be realized by a nonvolatile memory, which includes an algorithm configured to control operations of various components of a vehicle or data regarding software instructions to play the algorithm, and a processor, which is configured to perform operations described below using the data stored in the memory. Here, the memory and processor may be realized as separate chips. Alternately, the memory and processor may be realized as an integrated single chip. The controller may be configured by more than one type of processor.

Figure 2:
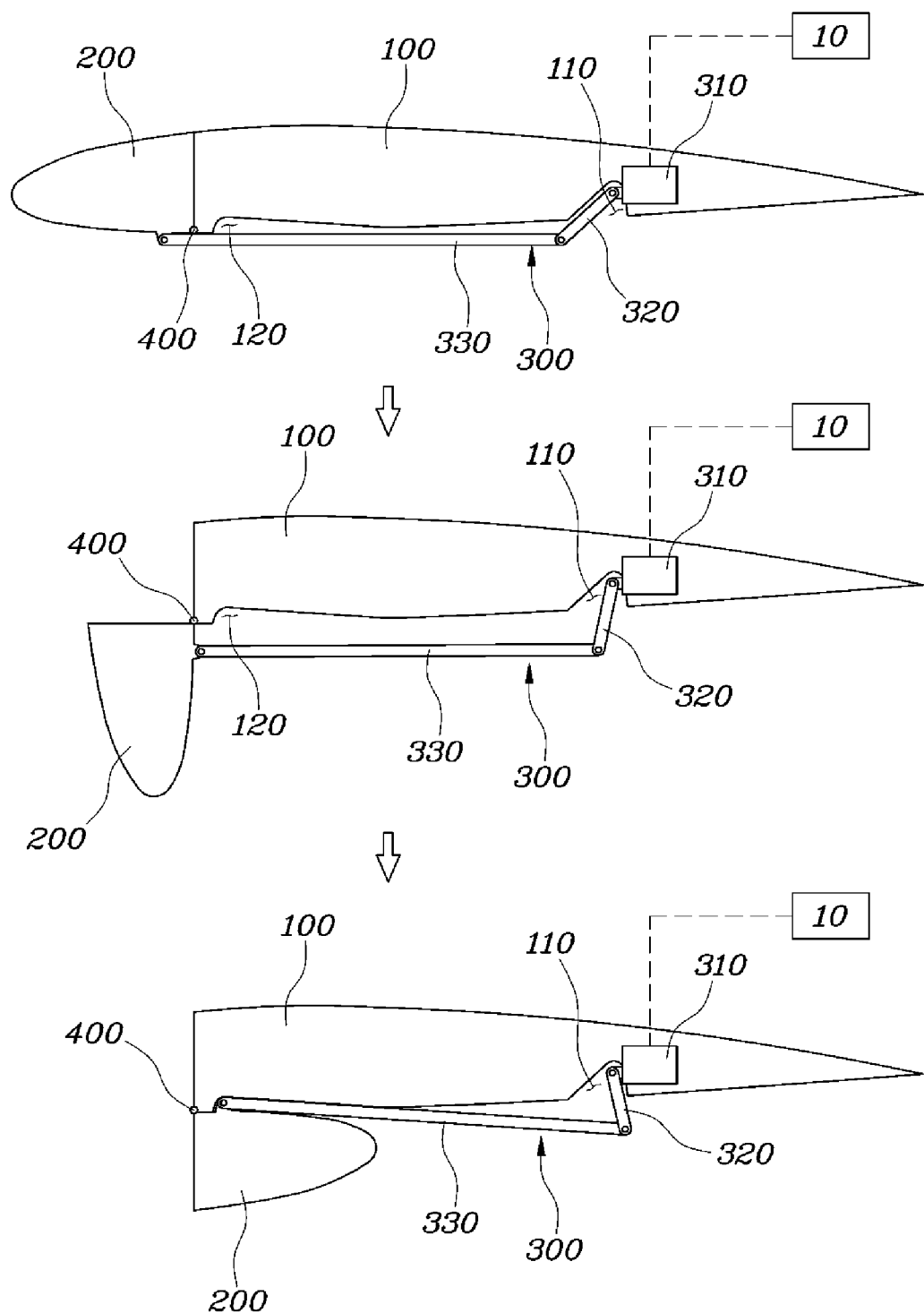
FIG. 2 is a side view showing operation of the air mobility according to the exemplary embodiment of the present invention.
Figure 3:
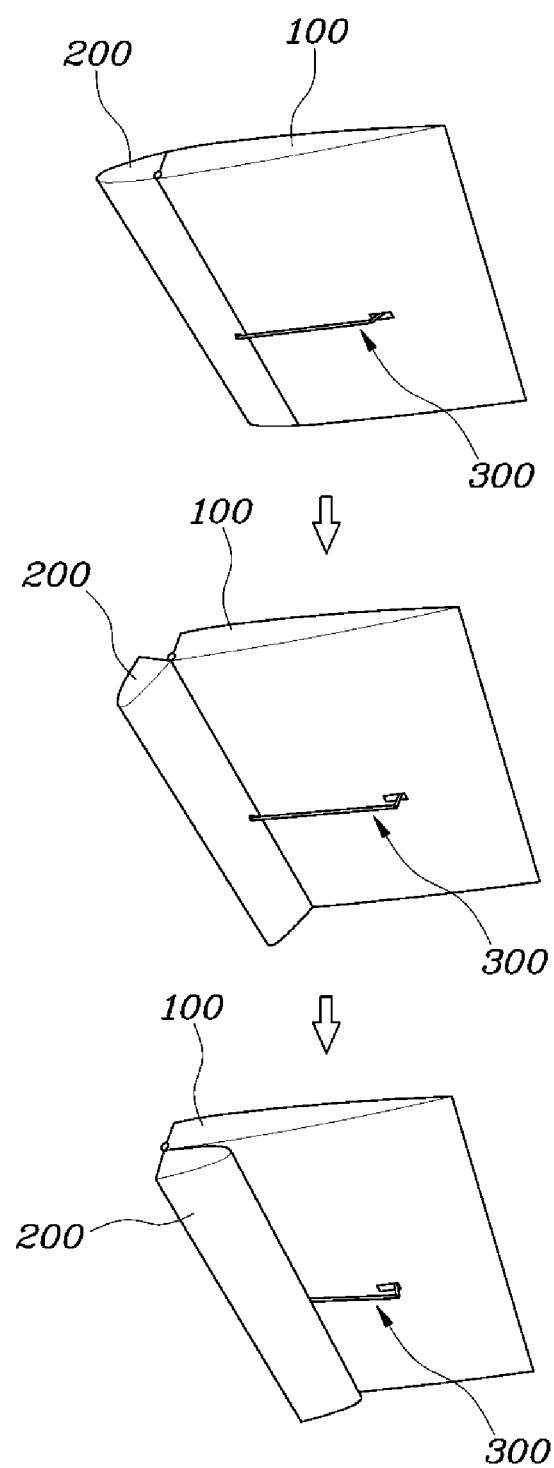
FIG. 3 is a rear view showing operation of the air mobility according to the exemplary embodiment of the present invention.
Figure 4:
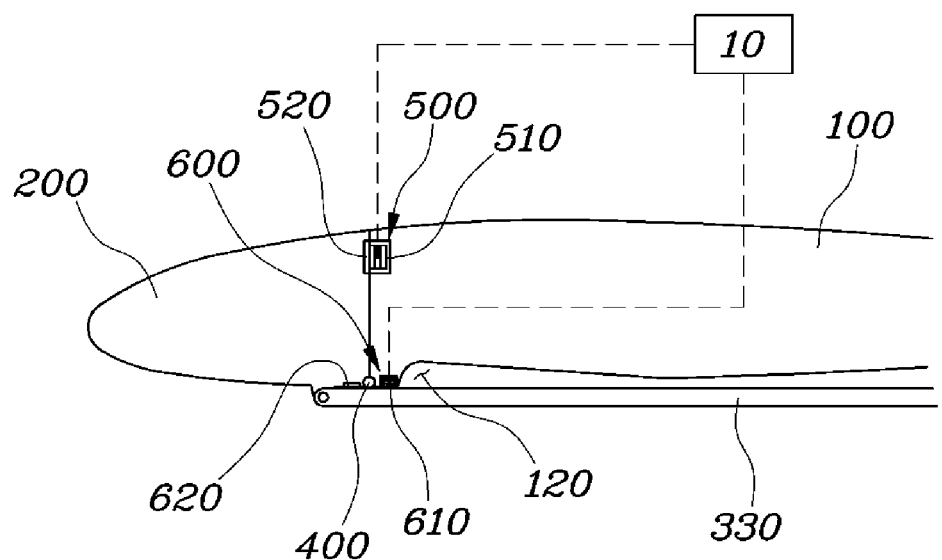
FIG. 4 is a side view showing operation of a first magnetic module and second magnetic module of the air mobility according to the exemplary embodiment of the present invention.
Figure 4:
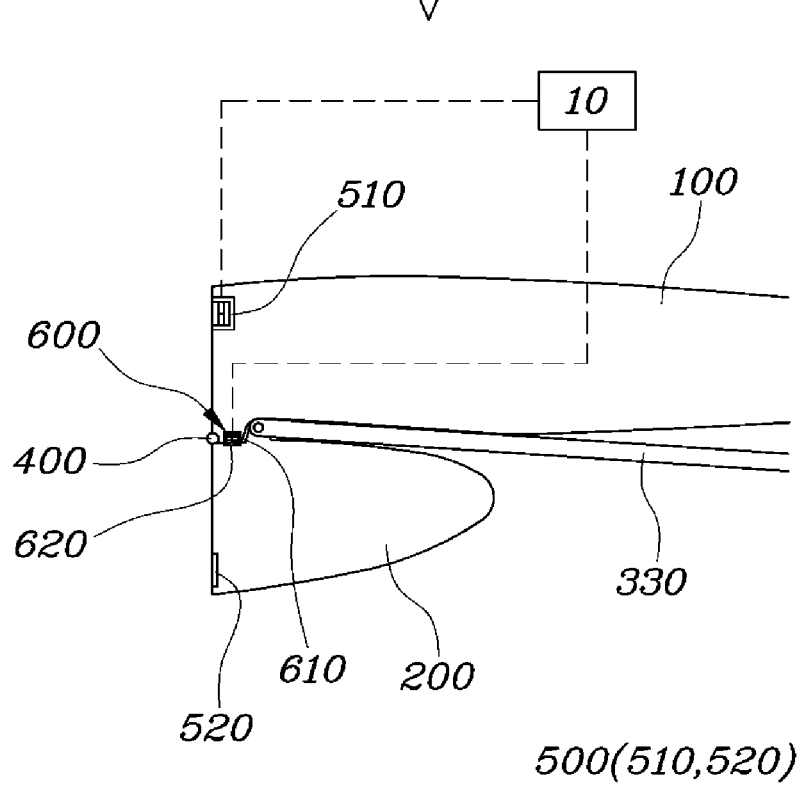
Figure 5:
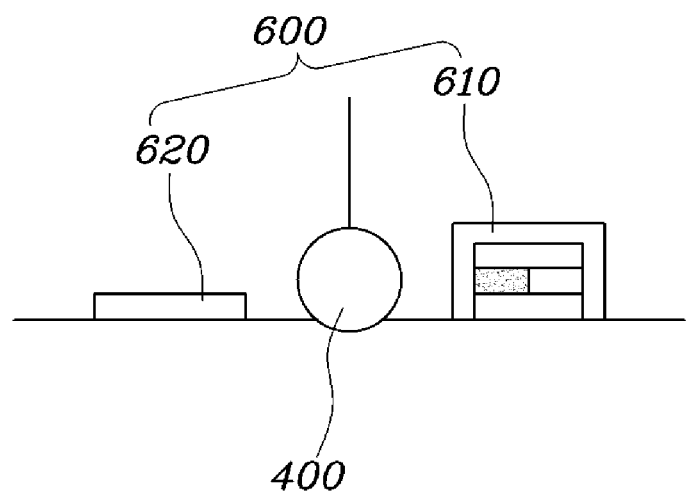
FIG. 5 and FIG. 6 are an enlarged view showing the second magnetic module.
Figure 6:
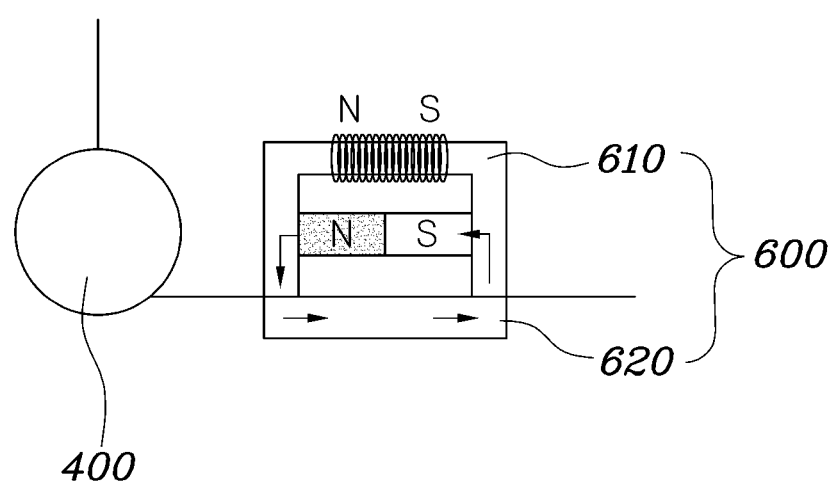

FIG. 1 is a side view showing an air mobility according to various exemplary embodiments of the present invention. FIG. 2 is a side view showing operation of the air mobility according to the exemplary embodiment of the present invention. FIG. 3 is a rear view showing operation of the air mobility according to the exemplary embodiment of the present invention. FIG. 4 is a side view showing operation of a first magnetic module 500 and second magnetic module 600 of the air mobility according to the exemplary embodiment of the present invention. FIGS. 5 and 6 are an enlarged view showing the second magnetic module.

Referring to FIG. 1, FIG. 2, FIG. 3, and FIG. 4, the air mobility according to various exemplary embodiments of the present invention will be described.

The air mobility according to various exemplary embodiments of the present invention is configured for vertical takeoff and landing, and is directed to reduce air resistance generated due to a fixed wing of the air mobility during vertical takeoff and landing of the air mobility.

The air mobility according to various exemplary embodiments of the present invention may include a wing portion 100 extending from a fuselage of the air mobility; a folded portion 200 provided at an edge portion of the wing portion 100, configured to extend from the wing portion 100 to form a part of the wing portion 100 during unfolding of the folded portion 200, and configured to move to overlap with the wing portion 100 during folding of the folded portion 200, so that an area of air resistance in a vertical direction of the wing portion 100 is reduced; an actuator 300 configured to provide power to the folded portion 200, so that the folded portion 200 is unfolded or folded to the wing portion 100; and the controller 10 configured to control the actuator 300 to fold the folded portion 200 during vertical takeoff or landing of the fuselage, and configured to control the actuator 300 to unfold the folded portion 200 during cruising of the fuselage.

As shown in FIG. 1, FIG. 2, and FIG. 3, in the air mobility, the wing portion 100 extends from the fuselage and is used during cruising of the fuselage of the air mobility, and the folded portion 200 extends from the wing portion 100 and forms the fixed wing of the air mobility by being integrated with the wing portion 100 during cruising.

The folded portion 200 is movably coupled to the wing portion 100 and may move toward the wing portion 100 to overlap with the wing portion 100, so that an area of air resistance in a vertical direction of the wing portion 100 is reduced during takeoff or landing of the air mobility.

The actuator 300 provides power to the folded portion 200 so that the folded portion 200 moves toward the wing portion 100, whereby, it is possible to reduce an area of air resistance in the vertical direction generated when the air mobility is vertically taken off and landed.

When the folded portion 200 is folded, minimum power required for vertical takeoff and landing of the air mobility may be reduced. Furthermore, during cruising of the air mobility, the folded portion 200 is unfolded to increase a total area of the wing portion 100, so that power required for cruising of the air mobility may be reduced.

The wing portion 100 and the folded portion 200 are located to be brought into surface-contact with each other. The air mobility according to various exemplary embodiments of the present invention includes a hinge portion 400 coupled to lower portions of the wing portion 100 and the folded portion 200 to enable the folded portion 200 to be rotatable. The actuator 300 may rotate the folded portion 200 around the hinge portion 400, so that the folded portion 200 may be unfolded or folded.

As shown in FIG. 2, the wing portion 100 and the folded portion 200 may be connected to each other by the hinge portion 400. The hinge portion 400 is provided at the lower portions of the wing portion 100 and the folded portion 200, as shown in FIG. 2. However, the hinge portion 400 may be provided at upper portions thereof.

The folded portion 200 may be rotated around the hinge portion 400, and the actuator 300 may provide power to the folded portion 200, so that the folded portion may be rotated around the hinge portion 400.

The actuator 300 may include: a driving device 310 located in the wing portion 100 and driven to rotate a driveshaft of the driving device; and a connection link configured such that a first end portion thereof is connected to the driveshaft of the driving device 310 and a second end portion thereof is connected to the folded portion 200 to unfold or fold the folded portion 200 in a response to driving of the driving device 310.

The actuator 300 includes the driving device 310 located in the wing portion 100 and the connection link connected to a rotation shaft the driving device 310 and operated in a response to operation of the driving device 310. Whereby, the displacement of the connection link is changed in a response to the operation of the driving device 310 and the folded portion 200 may be folded or unfolded.

In an exemplary embodiment of the present invention, the driving device 310 is a motor such as a servo motor.

The connection link includes: a first link 320 connected at a first end portion thereof to the driveshaft of the driving motor and rotated by a rotation of the driveshaft 305; and a second link 330 rotatably connected at a first end portion thereof to a second end portion of the first link 320 and rotatably connected at a second end portion thereof to a lower portion of the folded portion 200. The folded portion 200 may be unfolded or folded as the first link 320 is rotated and displacement of the second link 330 is changed.

The connection link includes: the first link 320 rotated while being connected to the driveshaft 305 of the driving device 310; and the second link 330 rotatably connected at the first end portion thereof to the first link 320 and rotatably connected at the second end portion thereof to the folded portion 200. Thereby, power of the driving device 310 may be transmitted through the first link 320 and the second link 330 to the folded portion 200, so that the folded portion 200 may be folded or unfolded by the driving device 310.

The connection link is operated with the first link 320 and the second link 330 in the exemplary embodiment of the present invention, but the connection link may be formed in various types of forms.

In an exemplary embodiment of the present invention, an end portion of the first link 320 is directly connected to the driving device 310 and the driving device 310 is a servo motor so that the rotation angle of the first link 320 is directly controlled by the driving device 310.

In an exemplary embodiment of the present invention, a portion of the first link 320 is pivotally connected to the wing portion 100 so that the first link 320 is pivotal by the motion of the driveshaft 305.

The wing portion 100 may include a first limiting portion 110 configured to limit a rotational angle of the first link 320 during unfolding or folding of the folded portion 200.

As shown in FIG. 2, the wing portion 100 has the first limiting portion 110 limiting the rotational angle of the first link 320, so that folding or unfolding of the folded portion 200 may be precise when the actuator 300 folds or unfolds the folded portion 200.

Furthermore, even when the driving device 310 malfunctions, the rotational angle of the first link 320 is limited by the first limiting portion 110, so that damage caused by a collision between the folded portion 200 and the wing portion 100 during folding or unfolding of the folded portion 200 may be prevented.

The wing portion 100 may include a second limiting portion 120 limiting displacement movement of the second link 330 during folding of the folded portion 200.

The second limiting portion 120 limiting movement of the second link 330 simultaneously with the first limiting portion 110 limiting rotation of the first link 320 is provided in the wing portion 100 to limit the movement of the second link 330.

Therefore, even when the driving device 310 malfunctions, the second limiting portion 120 limits movement of the second link 330 so that a collision between the folded portion 200 and the wing portion 100 during folding of the folded portion 200 may be prevented.

The air mobility may include the first magnetic module 500. The first magnetic module 500 includes: a magnetic body 510 located in the wing portion 100; and a fixed portion 520 located in the folded portion 200 at a location corresponding to the magnetic body 510. When a direction of a magnetic path is changed by power supply, the first magnetic module 500 fixes the wing portion 100 and the folded portion 200 to each other during unfolding of the folded portion 200, and separates the wing portion 100 and the folded portion 200 from each other during folding of the folded portion 200.

As shown in FIG. 4, to fix the folded portion 200 and the wing portion 100 during unfolding of the folded portion 200, the first magnetic module 500 which is located at a location where the folded portion 200 and the wing portion 100 are brought into contact with each other may fix the folded portion 200 and the wing portion 100 to each other by magnetic force.

The first magnetic module 500 may include the magnetic body 510 in which a magnetic material is located and the fixed portion 520 is fixed to the magnetic body 510. The magnetic body 510 may be located in the wing portion 100 and the fixed portion 520 may be located in the folded portion 200 at a location corresponding to the wing portion 100.

The magnetic body 510, 610 may be configured such that a permanent magnet, which is a neodymium (Nd—Fe—B) magnet, is located in an internal side thereof, an external side thereof is formed of a conductor, and the fixed portion 520, 620 is formed of a conductor.

The magnetic body 510, 610 may be in electrical connection. When a direction of a magnetic path is changed toward the fixed portion 520 by a transmitted electrical signal after the magnetic body 510 and the fixed portion 520 are in contact each other, the magnetic body 510 and the fixed portion 520 may be firmly fixed to each other by magnetic force.

A coil is wound on outside of the magnetic body 510, 610 to make an electromagnet, and a N-pole and a S-pole of the electromagnet may be changed by a direction in which current flows in the coil. As shown in FIG. 6, when current flows in the coil so that the N pole of the electromagnet is in the same direction as the N pole of the permanent magnet, and the S pole of the electromagnet is in the same direction as the S pole of the permanent magnet, a flow of magnetic field may be set. Thus, the fixed portions 520, 620 and the magnetic body parts 510, 620 may be firmly fixed to each other by magnetic force.

Further, when current flows in the coil so that the N-pole of the electromagnet is in the same direction as the S-pole of the permanent magnet, and the S-pole of the electromagnet is in the same direction as the N-pole of the permanent magnet, a flow of magnetic field may be set. Thus, the fixed state of the fixed portions 520, 620 and the magnetic body parts 510, 620 may be released by magnetic force.

Locations of the magnetic body 510 and the fixed portion 520 may be changed with each other. However, as the magnetic body 510 is larger in volume than the fixed portion 520, the magnetic body 510 is located in the wing portion 100.

The controller 10 may be connected to the first magnetic module 500 and may control the first magnetic module 500 to provide power to the magnetic body 510, so that the folded portion 200 is fixed to the wing portion 100 during unfolding of the folded portion 200.

The controller 10 may operate the actuator 300 to unfold the folded portion 200. When the folded portion 200 is fully unfolded, the magnetic body 510 of the first magnetic module 500 and the folded portion 200 may be brought into contact with each other.

After unfolding of the folded portion 200, the controller 10 may transmit an electrical signal to the magnetic body 510 of the first magnetic module 500 to fix the magnetic body 510 and the fixed portion 520 to each other.

Whereby, during cruising of the air mobility after vertical takeoff, an air mobility crash due to damages to the fuselage during folding of the folded portion 200 may be prevented.

The air mobility may include the second magnetic module 600. The second magnetic module 600 includes of a magnetic body 610 located in the wing portion 100 and a fixed portion 620 located in the folded portion 200 at a location corresponding to the magnetic body 610. When a direction of a magnetic path is changed by power supply, the second magnetic module 600 separates the wing portion 100 and the folded portion 200 from each other during unfolding of the folded portion 200 and fixes the wing portion 100 and the folded portion 200 during folding of the folded portion 200.

As shown in FIG. 4 and FIG. 5, the second magnetic module 600 as the same module as the first magnetic module 500 may be located at a location contacting with the wing portion 100 during folding of the folded portion 200.

The magnetic body 610 of the second magnetic module 600 is located in the wing portion 100 at a location where the folded portion 200 is folded toward the wing portion 100, and the fixed portion 620 of the second magnetic module 600 may be located in the folded portion 200 at a location corresponding to the magnetic body 610.

Whereby, the folded portion 200 may be firmly fixed to the wing portion 100 by magnetic force during folding of the folded portion 200.

The controller 10 is connected to the second magnetic module 600, and may control the second magnetic module 600 so that the folded portion 200 is fixed to the wing portion 100 during folding of the folded portion 200.

To fold the folded portion 200, the controller 10 terminates coupling of the first magnetic module 500, and then operates the actuator 300 to fold the folded portion 200.

When folding of the folded portion 200 is complete, the controller 10 may transmit an electric signal to the magnetic body 610 of the second magnetic module 600 to fix the folded portion 200 in a folded state.

Whereby, damages to the fuselage due to movement of the folded portion 200 during vertical takeoff or landing of the air mobility may be prevented.

The controller 10 may control the actuator 300 to fold the folded portion 200 during vertical takeoff of the air mobility, and to unfold the folded portion 200 during cruising after the vertical takeoff.

To reduce air resistance in the vertical direction during vertical takeoff of the air mobility, the controller 10 may operate the actuator 300 to fold the folded portion 200. The controller 10 may operate the actuator 300 to unfold the folded portion 200 during cruising after the vertical takeoff of the air mobility.

Whereby, the air resistance in the vertical direction is reduced and power generated during the vertical takeoff is reduced. Accordingly, electrical energy efficiency or fuel efficiency of the air mobility may be improved.

The controller 10 may control the actuator 300, so that the air mobility is vertically landed while the folded portion 200 is unfolded and the folded portion 200 is folded after the vertical landing of the air mobility.

The controller 10 may allow the air mobility to be safely landed while receiving the air resistance with the folded portion in an unfolded state during landing.

Accordingly, the controller 10 may operate the actuator 300 after landing of the air mobility is completed to fold the folded portion 200.

Accordingly, the present invention may have an effect of reducing a hangar space for housing the air mobility.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air mobility comprising:
a wing portion extending from a fuselage of the air mobility;
a folded portion provided at an edge of the wing portion, configured to extend from the wing portion to form a part of the wing portion during unfolding of the folded portion, and configured to move to overlap with the wing portion during folding of the folded portion so that an area of air resistance in a vertical direction of the wing portion is reduced;
an actuator connected to the folded portion and configured to provide power to the folded portion, so that the folded portion is unfolded or folded to the wing portion by the actuator; and
a controller engaged to the actuator and configured to control the actuator so that the folded portion is folded during vertical takeoff or landing of the fuselage, and configured to control the actuator to unfold the folded portion during cruising of the fuselage,
wherein the wing portion and the folded portion are located to be selectively brought into contact with each other,
wherein the air mobility further includes a hinge portion coupled to lower portions of the wing portion and the folded portion to enable the folded portion to be rotatable with respect to the wing portion,
wherein the actuator is configured to selectively rotate the folded portion around the hinge portion according to a signal of the controller, so that the folded portion is unfolded or folded,
wherein the actuator includes:
a driving device located in the wing portion and connected to the controller to be driven by the controller; and
a connection link coupled to the driving device and the folded portion to unfold or fold the folded portion in a response to driving of the driving device,
wherein the connection link includes:
a first link connected to the driving device and configured to be rotated by the driving device; and
a second link, wherein a first end portion of the second link is pivotally connected to an end portion of the first link and a second end portion of the second link is pivotally connected to a lower portion of the folded portion,
wherein the folded portion is configured to be unfolded or folded as the first link is rotated and displacement of the second link is changed by the driving device,
wherein the wing portion includes a first limiting portion configured to limit a rotational angle of the first link during the unfolding or the folding of the folded portion, and
wherein a portion of the wing portion is recessed from an outer surface of the wing portion to form the first limiting portion having a recess of an acute angle.

2. The air mobility of claim 1, wherein the actuator includes:
a driving device located in the wing portion and driven by the controller to rotate a driveshaft of the driving device; and
a connection link, wherein a first end portion of the connection link is pivotally connected to the driveshaft of the driving device and a second end portion of the connection link is pivotally connected to the folded portion to unfold or fold the folded portion in a response to driving of the driving device.

3. The air mobility of claim 1, wherein the controller is configured to control the actuator to fold the folded portion during the vertical takeoff of the air mobility and to unfold the folded portion during the cruising of the air mobility after the vertical takeoff.

4. The air mobility of claim 1, wherein the controller is configured to control the actuator, so that the air mobility is vertically landed in a state in which the folded portion is unfolded and the folded portion is folded after the vertical landing.

5. An air mobility comprising:
a wing portion extending from a fuselage of the air mobility;
a folded portion provided at an edge of the wing portion, configured to extend from the wing portion to form a part of the wing portion during unfolding of the folded portion, and configured to move to overlap with the wing portion during folding of the folded portion so that an area of air resistance in a vertical direction of the wing portion is reduced;
an actuator connected to the folded portion and configured to provide power to the folded portion, so that the folded portion is unfolded or folded to the wing portion by the actuator; and
a controller engaged to the actuator and configured to control the actuator so that the folded portion is folded during vertical takeoff or landing of the fuselage, and configured to control the actuator to unfold the folded portion during cruising of the fuselage,
wherein the wing portion and the folded portion are located to be selectively brought into contact with each other,
wherein the air mobility further includes a hinge portion coupled to lower portions of the wing portion and the folded portion to enable the folded portion to be rotatable with respect to the wing portion,
wherein the actuator is configured to selectively rotate the folded portion around the hinge portion according to a signal of the controller, so that the folded portion is unfolded or folded,
wherein the actuator includes:
a driving device located in the wing portion and connected to the controller to be driven by the controller; and
a connection link coupled to the driving device and the folded portion to unfold or fold the folded portion in a response to driving of the driving device,
wherein the connection link includes:
a first link connected to the driving device and configured to be rotated by the driving device; and
a second link, wherein a first end portion of the second link is pivotally connected to an end portion of the first link and a second end portion of the second link is pivotally connected to a lower portion of the folded portion,
wherein the folded portion is configured to be unfolded or folded as the first link is rotated and displacement of the second link is changed by the driving device, and
wherein the wing portion includes a second limiting portion configured to limit displacement moving of the second link during the folding of the folded portion.

6. The air mobility of claim 5, wherein a portion of the wing portion is recessed from an outer surface of the wing portion to form the second limiting portion having a recess of an obtuse angle.

7. An air mobility comprising:
a wing portion extending from a fuselage of the air mobility;
a folded portion provided at an edge of the wing portion, configured to extend from the wing portion to form a part of the wing portion during unfolding of the folded portion, and configured to move to overlap with the wing portion during folding of the folded portion so that an area of air resistance in a vertical direction of the wing portion is reduced;
an actuator connected to the folded portion and configured to provide power to the folded portion, so that the folded portion is unfolded or folded to the wing portion by the actuator;
a controller engaged to the actuator and configured to control the actuator so that the folded portion is folded during vertical takeoff or landing of the fuselage, and configured to control the actuator to unfold the folded portion during cruising of the fuselage; and
a magnetic module including a magnetic body located in the wing portion and a fixed portion located in the folded portion at a location corresponding to the magnetic body,
wherein the magnetic module is configured to fix the wing portion and the folded portion during the unfolding of the folded portion and to separate the wing portion and the folded portion from each other during the folding of the folded portion as power is applied to the magnetic module and a direction of a magnetic path is changed.

8. The air mobility of claim 7, wherein the controller is connected to the magnetic module, and is configured to control the magnetic module to apply power to the magnetic body of the magnetic module, so that the folded portion is fixed to the wing portion during the unfolding of the folded portion.

9. An air mobility comprising:
a wing portion extending from a fuselage of the air mobility;
a folded portion provided at an edge of the wing portion, configured to extend from the wing portion to form a part of the wing portion during unfolding of the folded portion, and configured to move to overlap with the wing portion during folding of the folded portion so that an area of air resistance in a vertical direction of the wing portion is reduced;
an actuator connected to the folded portion and configured to provide power to the folded portion, so that the folded portion is unfolded or folded to the wing portion by the actuator;
a controller engaged to the actuator and configured to control the actuator so that the folded portion is folded during vertical takeoff or landing of the fuselage, and configured to control the actuator to unfold the folded portion during cruising of the fuselage; and
a magnetic module including a magnetic body located in the wing portion and a fixed portion located in the folded portion at a location corresponding to the magnetic body,
wherein the magnetic module is configured to separate the wing portion and the folded portion from each other during the unfolding of the folded portion and to fix the wing portion and the folded portion during the folding of the folded portion as power is applied to the magnetic module and a direction of a magnetic path is changed.

10. The air mobility of claim 9, wherein the controller is connected to the magnetic module, and is configured to control the magnetic module so that the folded portion is fixed to the wing portion during the folding of the folded portion.

* * * * *